United States Patent [19]

Takagi

[11] Patent Number: 5,425,238
[45] Date of Patent: Jun. 20, 1995

[54] HYDRAULIC NONSTEP TRANSMISSION APPARATUS

[75] Inventor: Izumi Takagi, Akashi, Japan

[73] Assignee: Kawasaki Jukogyo Kabushiki Kaisha, Kobe, Japan

[21] Appl. No.: 67,940

[22] Filed: May 27, 1993

[30] Foreign Application Priority Data

Jun. 1, 1992 [JP] Japan .................... 4-140406

[51] Int. Cl.⁶ .............................................. F16D 31/02
[52] U.S. Cl. ........................................ 60/449; 60/468; 60/489
[58] Field of Search ................. 60/447, 449, 468, 488, 60/489, 494

[56] References Cited

U.S. PATENT DOCUMENTS

| | | | |
|---|---|---|---|
| 3,364,679 | 1/1968 | Osojnak | 60/489 |
| 3,986,357 | 10/1976 | Hoffmann | 60/447 |
| 4,495,767 | 1/1985 | Akiyama et al. | 60/468 |

FOREIGN PATENT DOCUMENTS

54-90450 7/1979 Japan .
237164 10/1987 Japan .................... 60/488

*Primary Examiner*—F. Daniel Lopez
*Attorney, Agent, or Firm*—Leydig, Voit & Mayer

[57] ABSTRACT

A hydraulic nonstep transmission apparatus with low costs and high reliability is provided which is capable of automatically determining a speed-change ratio corresponding to engine speed and motor load and capable of smoothly performing clutch operation to a clutch-on state through a clutch meeting state. The apparatus comprises: a clutch means provided in a hydraulic closed circuit; a governor hydraulic actuator for moving the motor swash plate toward its vertical position in accordance with an increase in the rotational speed of an engine; and a governor hydraulic pressure switch means provided in a governor hydraulic fluid passage of the governor hydraulic actuator and drivingly connected to the clutch means to disconnect the governor hydraulic pressure during the period from a clutch-off state to the elapse of the clutch meeting state and to supply the governor hydraulic pressure before and after the transition to clutch-on after substantially completing the clutch meeting state.

10 Claims, 8 Drawing Sheets

HYDRAULIC NONSTEP TRANSMISSION APPARATUS

BACKGROUND OF THE INVENTION

1. Field of the Invention

The present invention relates to a hydraulic nonstep transmission apparatus in which a swash plate hydraulic pump and a swash plate hydraulic motor are connected to each other through a hydraulic closed circuit so as to make the capacity of the hydraulic motor variable by changing the tile angle of the swash place of the motor.

2. Description of the Related Art

Conventional arts of this type of hydraulic nonstep transmission apparatus include one disclosed in Japanese Patent Examined Publication No. 59-38467 in which a hydraulic servomotor is drivingly connected to the swash plate of a motor, thus varying the tilt angle of the motor swash plate by means of the hydraulic servomotor to perform nonstep speed-change control.

Of the system for controlling the motor swash plate by a hydraulic servomotor as described, construction becomes complicated, cost of component parts is high and maintenance requires time and labor.

SUMMARY OF THE INVENTION

An object of the present invention is to provide a hydraulic nonstep transmission apparatus with low costs and high reliability, capable of automatically determining a speed-change ratio corresponding to the rotational speed of an engine and the motor load and also capable of smoothly performing clutch operation to attain clutch-on state through clutch meeting state.

Accordingly, the present invention provides a hydraulic nonstep transmission apparatus in which a swash plate hydraulic pump and a swash plate hydraulic motor are connected to each other through a hydraulic closed circuit so as to make the capacity of the hydraulic motor variable by changing the tilt angle of the motor swash plate, comprising: clutch means for short-circuiting the hydraulic closed circuit to achieve a clutch-off state; a governor hydraulic actuator for moving the motor swash plate toward its vertical position upon an increase in the working fluid pressure corresponding to the rotational speed of an engine; and a governor hydraulic pressure switch means provided in a governor hydraulic fluid passage for supplying governor hydraulic pressure to the governor hydraulic actuator, wherein the governor hydraulic pressure switch means is drivingly connected to the clutch means so as to disconnect the governor hydraulic pressure from a clutch-off state until the elapse of a clutch meeting state but to supply the governor hydraulic pressure before and after the transition to a clutch-on state after substantially completing the clutch meeting state.

When the swash plate hydraulic pump is operated by rotation of an input shaft, the working fluid ejected from the hydraulic pump is pressure-fed to the hydraulic motor by a hydraulic distributor ring having self-gap compensating function. A motor cylinder block is rotated by the sum of a reaction torque given to the motor cylinder block by pump plunger in the ejection process through the pump swash plate and a reaction torque which the motor plunger in the expansion process receives from the motor swash plate.

The motor swash plate is automatically controlled in its tilt angle in accordance with the rotational speed of an engine and the motor load, by a force acting toward its vertical position exerted by the governor hydraulic actuator which causes the working fluid pressure to be increased for example substantially in proportion to the square of the rotational speed of the engine and by the tilting moment due to the pressing force of the motor plungers. Nonstep speed-change control of the rotation of the hydraulic motor is thereby achieved.

In clutching, a clutch-off state is achieved by short-circuiting the closed circuit between the hydraulic motor and the hydraulic pump by means of the clutch means. In the clutch-off state, the governor hydraulic pressure to the governor hydraulic actuator is disconnected by the governor hydraulic pressure switch means, thereby the motor swash plate is maintained at its maximum tilt state, i.e., maximum reduction ratio.

The governor hydraulic pressure to the governor hydraulic actuator is disconnected in a similar manner as the above clutch-off state also for the period in which transition from the clutch-off state to the elapse of the clutch meeting state is made by the clutching operation. Thus, even if the motor load is relatively small to make smaller the tilting moment for the motor swash plate, the motor swash plate is kept at its maximum tilt state, i.e., maximum reduction ratio, whereby power transmission to the hydraulic motor is smoothly initiated and the hydraulic motor is started to be operated smoothly.

Further, the governor hydraulic pressure is supplied to the governor hydraulic actuator before and after the transition to clutch-on state after substantially completing the clutch meeting state, whereby automatic speed-change control is performed based on the engine rotary speed and the motor load as described.

DESCRIPTION OF THE PREFERRED EMBODIMENT

Figure 1:
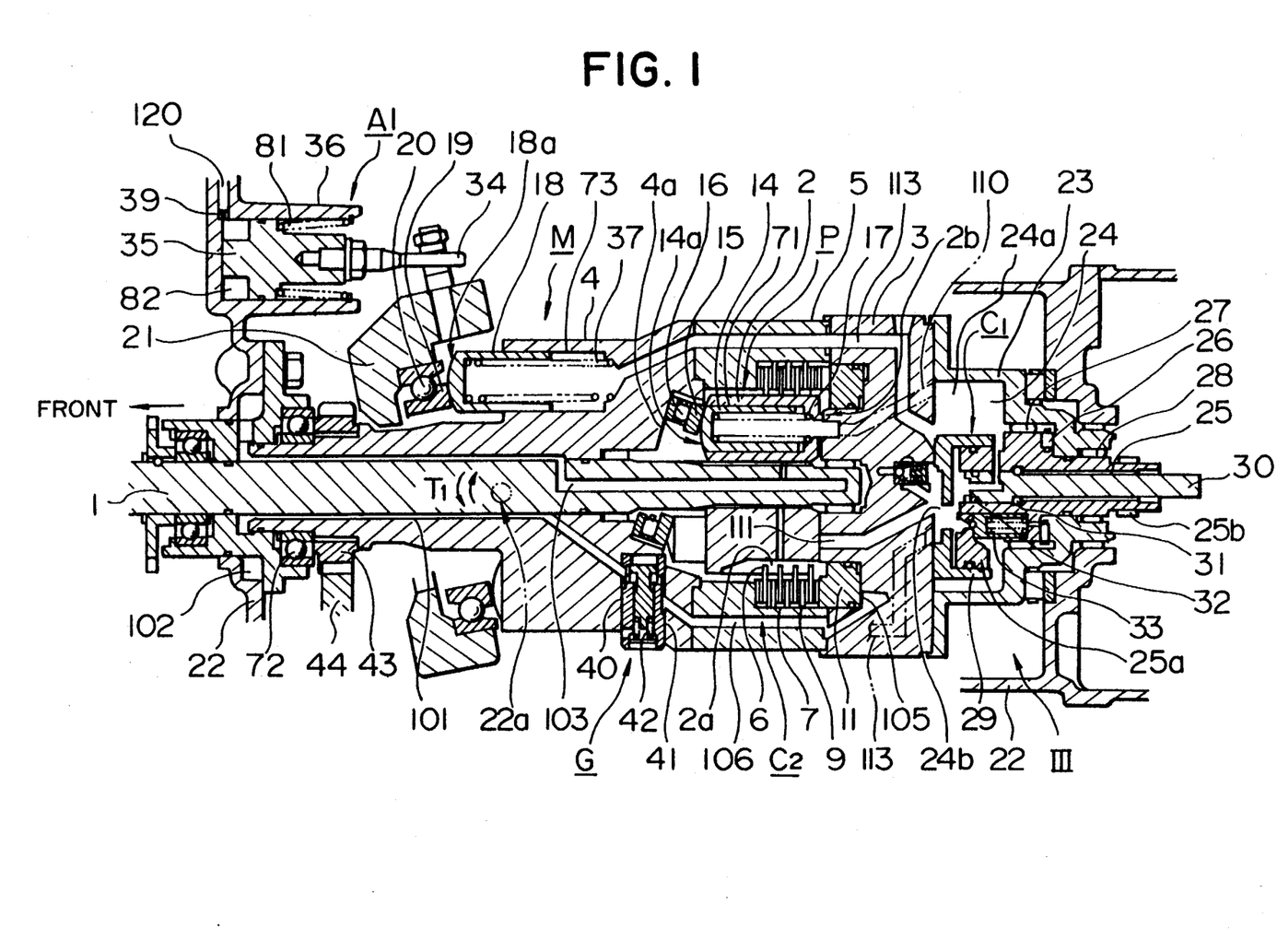
FIG. 1 is an entire longitudinal sectional view of a hydraulic nonstep transmission apparatus according to the present invention.

FIG. 1 shows an overall longitudinal sectional view of a hydraulic nonstep transmission apparatus (excluding the shift means) according to the present invention. In order to facilitate understanding, the front and rear in the axial direction thereof is supposed as indicated in the figure.

First, its overall construction will be described. The front end portion of an input transmission on shaft 1 is drivingly connected to an engine (not shown). A swash plate hydraulic motor (an axial type plunger motor) M and a swash plate hydraulic pump (an axial type plunger pump) P are serially positioned on the outer periphery of the input shaft 1 arranged in the front and rear direction (axial direction) thereof in that order from the front side.

More specifically, starting from the front, a motor swash plate 19, a motor cylinder block 4, a pump swash plate 15 and a pump cylinder block 2 are arranged in order in the front and rear direction (axial direction) thereof. The pump cylinder block 2 is surrounded by an intermediate drum 5 which extends around the outer peripheral surface of the pump cylinder block 2 and is separated therefrom by a gap. A direct transmission hydraulic clutch C2 is provided between the intermediate drum 5 and the pump cylinder block 2. A valve body 3 having a hydraulic passage is provided in the rear of the intermediate drum 5 and the pump cylinder block 2. The valve body 3 is rigidly connected at its rear end to a rear cover 23. The rear cover 23 contains: a hydraulic distributor ring 29 for selecting the forward and backward operations, which divides the cavity 24 inside the rear cover 23 into an outer cavity 24a and an inner cavity 24b; a fluid distributor ring supporting shaft 25 for supporting the hydraulic distributor ring 29; a spool 30 for switching a main clutch C1; etc. A governor hydraulic actuator A1 is provided in the upper front of the motor swash plate 19. The hydraulic actuator A1 performs automatic speed-change control by changing the tilt angle of the motor swash plate 19.

The hydraulic pump P will be described. The inside surface of the pump cylinder block 2 is fitted on the outer peripheral surface of a rear end portion of the input shaft 1, by means of splines, so that the pump cylinder block 2 is rotated together with the input shaft 1. The pump cylinder block 2 has an odd number, e.g., five, of cylindrical holes 71 which are circumferentially and equidistantly arranged. Each cylindrical hole 71 extends in parallel to the input shaft 1, and the opening thereof faces the front. A cylindrical pump plunger 14 is fitted in each cylindrical hole 71 so as to axially slide and protrude forward therefrom. Each pump plunger 14 has a blunt spherical portion 14a formed at its front end. The blunt spherical portion 14a of each pump plunger 14 abuts on the pump swash plate 15 provided in front thereof. The pump swash plate 15 guides the reciprocating movement of the pump plunger 14. The pump swash plate 15 is positioned on a rear slant surface 4a of the motor cylinder block 4 by means of a thrust bearing 16. On the other hand, each pump plunger 14 contains a coil spring 17 provided between the pump plunger 14 and the inside rear surface of the corresponding cylindrical hole 71. Thus, the pump plungers 14 are forced forward to the pump swash plate 15 so that the pump swash plate 15 will not fall off. At the same time, because the coil springs 17 force the pump cylinder clock 2 backward to the valve body 3, an enhanced sealing characteristic of a sliding seal surface 2b abutting on the pump cylinder block 2 during a low-speed operation is achieved. Further, because the coil springs 17 force the respective pump plungers 14 forward, the hydraulic pump P obtains a self-suction capability.

The hydraulic motor M will be described. The motor cylinder block 4 is rigidly connected to the valve body 3 by means of the intermediate drum 5. The inside peripheral surface of the motor cylinder block 4 is rotatably fitted over the input shaft 1, intervened by a ring-like fluid passage 101. The motor cylinder block 4 is supported by a transmission case 22 by means of a bearing 72, etc. The motor cylinder block 4 has an odd number, e.g., nine, of cylindrical holes 73 which are circumferentially and equidistantly arranged. Similar to the cylindrical holes 71 of the pump cylinder block 2, each cylindrical hole 73 extends in parallel to the input shaft 1, ed the opening thereof faces the front. A cylindrical motor plunger 18 is fitted in each cylindrical hole 73 so as to axially slide and protrude forward therefrom. Each motor plunger 18 has a blunt spherical portion 18a formed at its front end. The blunt spherical portion 18a of each motor plunger 18 abuts on the motor swash plate 19 provided in front thereof. The motor swash plate 19 guides the reciprocating movements of the motor plungers 18. The motor swash plate 19 is supported by a swash plate holder 21 by means of a rolling element 20. On the other hand, each motor plunger 18 contains a coil spring 37 provided between the motor plunger 18 and the inside rear surface of the corresponding cylindrical hole. Thus, the motor plungers 18 are forced forward and, further, the hydraulic motor M is provided with a self-suction capability because the coil springs 37 force the motor plungers 18 outwards and enable the plungers 13 to suck fluid.

The fluid passage will be described. Referring to FIG. 1, the ring-like fluid passage 101 formed over the circumference of the input shaft 1 is connected at a front end portion of the ring-like fluid passage 101 to an HST charging feed pump (not shown) or the like by way of a ring-like fluid chamber 102. The hydraulic fluid is supplied from an oil catcher or the like through the ring-like fluid chamber 102 to the ring-like fluid passage 101.

Figure 2:
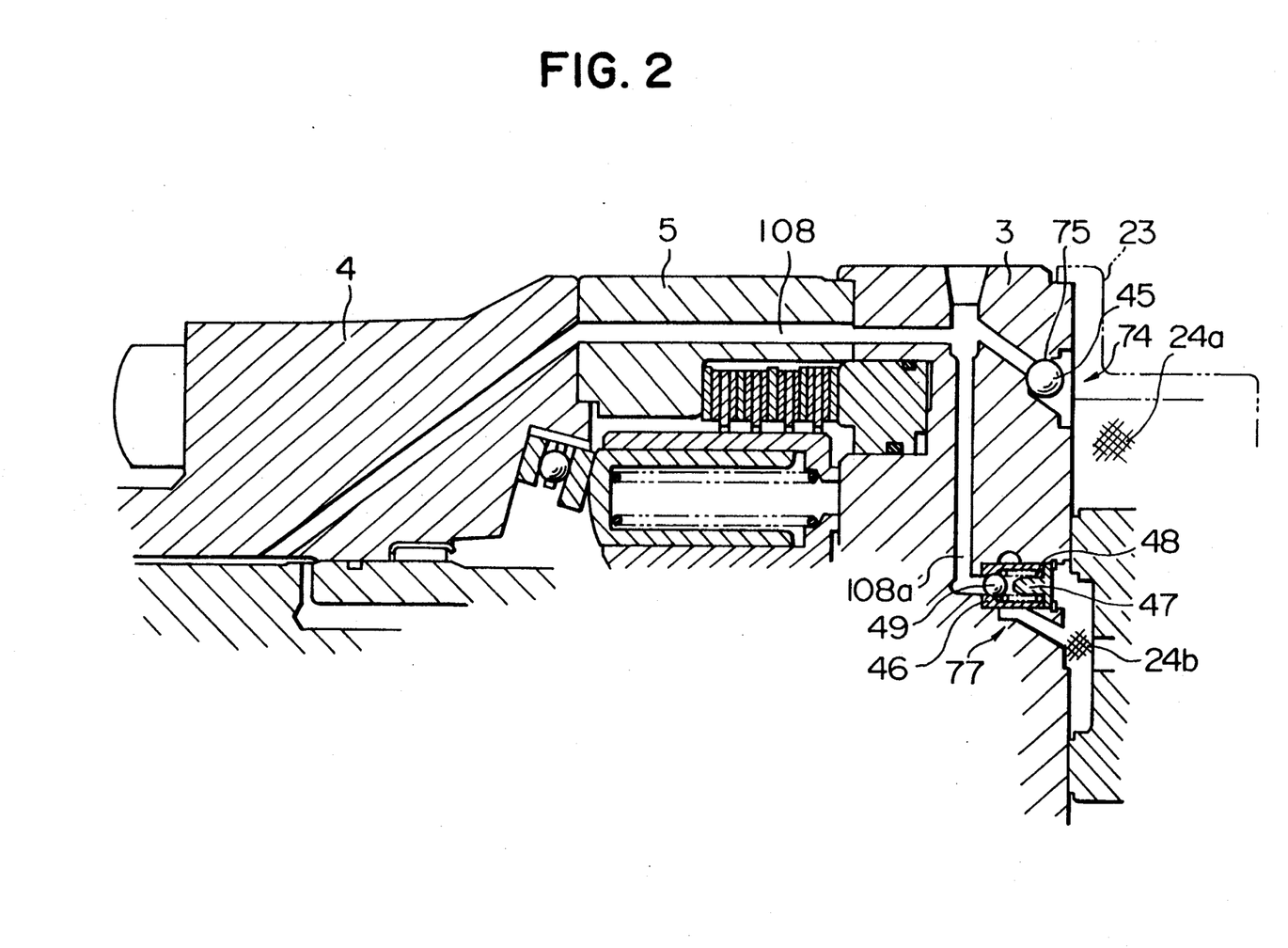
FIG. 2 is an enlarged partial longitudinal sectional view of a portion including a charging fluid passage of the hydraulic transmission apparatus shown in FIG. 1.

The ring-like fluid passage 101 connects at its rear end portion to: a direct transmission hydraulic clutch cooling fluid passage 103 extending through at least a portion of the input shaft 1 to the direct transmission hydraulic clutch C2; a direct transmission hydraulic clutch operating fluid passage 106 extending through the motor cylinder block 4, the intermediate drum 5 and the valve body 3 to an operating fluid chamber 105 of the direct transmission hydraulic clutch C2; and a charging fluid passage 108 extending through the motor cylinder block 4, the intermediate drum 5 and the valve body 3 to the outer cavity 24a inside the rear cover 23, as shown in FIG. 2.

The opening of the charging fluid passage 108 to the outer cavity 24a is provided with a check valve 74. The check valve 74 is composed of a valve seat 75 formed on the valve body 3 and a steel ball 45 which fits onto the valve seat 75. Further, the valve seat 75 has a surface angled in such a manner that during rotation of the valve boy 3, a centrifugal force acting on the steel ball 45 causes the steel ball 45 to move backward (in the direction to open the valve).

The charging fluid passage 108 has a branch passage 108a reaching to the inner cavity 24b. The opening of the branch passage 108a to the inner cavity 24b is provided with a check valve 77. The check valve 77 is composed of: a valve seat 46; a compressed coil spring 48; a steel ball 49 pressed onto the valve seat 46 by the restoring force of the compressed coil spring 48; and a stopper rod 47. The check valve 77 is located in substantially the central portion of the valve body 3.

A description will now be given of the fluid passage forming a closed circuit through which the operating fluid supplied from the above described charging fluid passage 108 to the cavity 24 reaches the hydraulic motor M by way of the hydraulic pump P of FIG. 1 and then returns to the cavity 24.

Formed on the valve body 3 with respect to the hydraulic pump P are: pump-in passages 110 for communicating the pump cylindrical holes 71 in the suction process and the outer cavity 24a as shown in an upper portion of FIG. 1, for sucking the operating fluid into the pump cylindrical holes 71 from the outer cavity 24a; and pump-out passages 111 for communicating the pump cylindrical holes 71 in the ejection process and the inner cavity 24b as shown in a lower portion of FIG. 1, for ejecting the operating fluid to the inner cavity 24b from the pump cylindrical holes 71.

Nine motor in-out passages 113 connected to the respective motor cylindrical holes 73 are formed with respect to the hydraulic motor M through the valve body 3, the intermediate drum 5 and the motor cylinder block 4. These motor in-out passages 113 connect the cavity 24 with the respective motor cylindrical holes 73. The rear end ports of the motor in-out passages 113 are arranged along the circumference of a circle having its center on the rotational axis. As the valve body 3 rotates together with the motor cylinder block 4: the motor cylindrical hole 73 in its expansion process is connected to the inner cavity as shown in the lower part of FIG. 1 so as to pressure-feed the working fluid to the motor cylindrical holes 73 from the inner cavity 24b; and, on the other hand, the motor cylindrical hole 73 in its discharge process is connected to the outer cavity 24a as shown in the upper part of FIG. 1 so as to discharge the working fluid to the outer cavity 24a from the motor cylindrical hole 73.

A swash plate holder 21 as shown in FIG. 1 is supported on a transmission case 22 by means of a trunnion shaft 22a which is perpendicular to the input shaft 1 and may be tilted in the manner of a pivot about the trunnion axis. The swash plate holder 21 is varied in its angle with respect to the plane vertical to the input shaft axis by tilting moment due to the above described governor hydraulic actuator A1 for automatic speed-change control and a motor plunger 18 which will be described later. Thus, the stroke of the motor plunger 18 may be adjusted to vary the motor capacity without steps.

The speed reduction ratio of the rotational speed of the hydraulic motor M to the rotational speed of the hydraulic pump P is obtained by the following expression:

Speed Reduction Ratio
= Pump Rotational Speed/Motor Rotational Speed
= 1 + (Motor capacity/Pump Capacity)

As understood from the above expression, the speed reduction ratio can be changed from one to a desired value by changing the capacity of the hydraulic motor M from zero to a corresponding value. The motor capacity is determined by the stroke length of the motor plunger 18, which length is determined by the angle of the motor swash plate 19. If the motor swash plate 19 is positioned vertically with respect to the axis of the input shaft, the motor capacity becomes zero as the above stroke becomes zero, where the transmission ratio is one. As the angle of the motor swash plate 19 with respect to the axis of the input shaft 1 is reduced as shown in FIG. 1, the transmission ratio is increased.

The construction of means for controlling the tilt angle of the swash plate holder 21 will be described in detail. The governor hydraulic actuator A1 has a piston 35 having a cylindrical slide portion, fitted into a cylinder 36 which is formed together with the transmission case 22. The piston 35 is pushed forward by a coil spring 81 which is provided in a compressed manner between the piston 35 and a spring stopper ring provided at a rear end portion of the cylinder 36. The piston ring 35 has a rod portion integrally formed thereon and is connected to a rod end 34 which protrudes backward. The rod end 34 is connected to the upper end portion of the motor swash plate holder 21 by ball-and-socket joint means. A fluid chamber 82 in the cylinder 36 is connected by way of a flow adjustment throttle 39 to an inlet fluid passage 120 formed in the wall of the transmission case 22. The inlet fluid passage 120 is connected to a governor hydraulic source 8 through a governor hydraulic changeover mechanism 90 of FIG. 5 which will be described later. When the governor hydraulic changeover mechanism is open, governor hydraulic pressure is supplied to the above fluid chamber, which varies in pressure substantially in proportion to the square of the rotational speed of the engine. Thus the working fluid pressure in the fluid chamber 82 of the cylinder 36 is increased in accordance with the increase in the rotational speed of the engine (substantially proportional to the square of the rotational speed of the engine), so as to cause the motor swash plate 19 to rise against the force of the coil spring 81 to the position where it is vertical with respect to the input shaft 1.

On the other hand, the trunnion shaft 22a of the swash plate holder 21 is positioned so that its axis is deviated from the motor rotational axis away from the above hydraulic actuator (downward in the figure) and is arranged to the rear of the motor swash plate 19. Thereby, it is tilted with respect to the motor swash plate 19 by the forward pressing load of the motor plunger 18, to cause a tilting moment thereof in the direction of T1 toward which the speed reduction ratio is increased. The tilting moment is increased as the working fluid pressure within the motor plunger 18 rises due to increasing motor load, to increase the tilt of the motor swash plate 19 so as to increase the speed reduction ratio.

As described above, the transmission control device comprises three components of: the governor hydraulic pressure within the cylinder fluid chamber 82 acting so as to cause the motor swash plate 19 to rise in accordance with an increase in the rotational speed of the engine (substantially proportional to the square of the rotational speed of the engine); the motor swash plate 19 eccentrically positioned so as to be tilted by the pressing load of the motor plunger 18 corresponding to the increase of motor load; and the coil spring 81 for pushing the piston 35 toward the direction along which the tilt angle is increased. By combination of these components, a speed reduction ratio corresponding to the engine speed and the motor load may be automatically achieved.

The construction within the rear cover 23 will be described. As mentioned above, the rear cover 23 is rigidly coupled to the rear end surface of the valve body 3 so that they are rotated together. The above-mentioned cavity 24 is surrounded by the rear end surface of the valve body 3 and the inside surface of the rear cover 23. The hydraulic-distributor ring supporting shaft 25 provided in the cavity 24 has substantially the same axis as the input shaft 1. The hydraulic distributor ring supporting shaft 25 is rotatably supported by the rear cover 23 by means of radial bearings 27 and 28, and stopped from shifting backward, without being prevented from rotating, by means of a thrust bearing 26 which is provided between the hydraulic distributor ring supporting shaft 25 and a rear stepped portion of the rear cover 23.

The supporting shaft 25 has an eccentric cylindrical portion 25a which is formed together with a front end portion of the supporting shaft 25 but has an axis apart from the axis of the supporting shaft 25. The eccentric cylindrical portion 25a is fitted in the above-mentioned hydraulic distributing ring 29 having a substantial bottom. Thereby, the cavity 24 inside the rear cover 23 is divided into the outer cavity 24a which is outside the hydraulic distributor ring 29 and the inner cavity 24b which is inside the fluid distributor ring 29. The front end surface of the hydraulic ring 29 is pressed by the pressure of the working fluid in the inner cavity 24b so as to slidably connect the rear end surface of the valve body 3. Therefore, because the force pressing the hydraulic distributor ring 29 onto the rear end surface of the valve body 3 varies with the pressure of the fluid in the inner cavity 24b, a gap between the hydraulic distributor ring 29 and the valve body 3 is automatically eliminated in accordance with the fluid pressure therein. Further, the hydraulic distributor ring 29 can be selectively positioned at the forward driving position F, the neutral position N and the rear driving position R, as shown in FIG. 4, by rotation of the supporting shaft 25.

Figure 3:
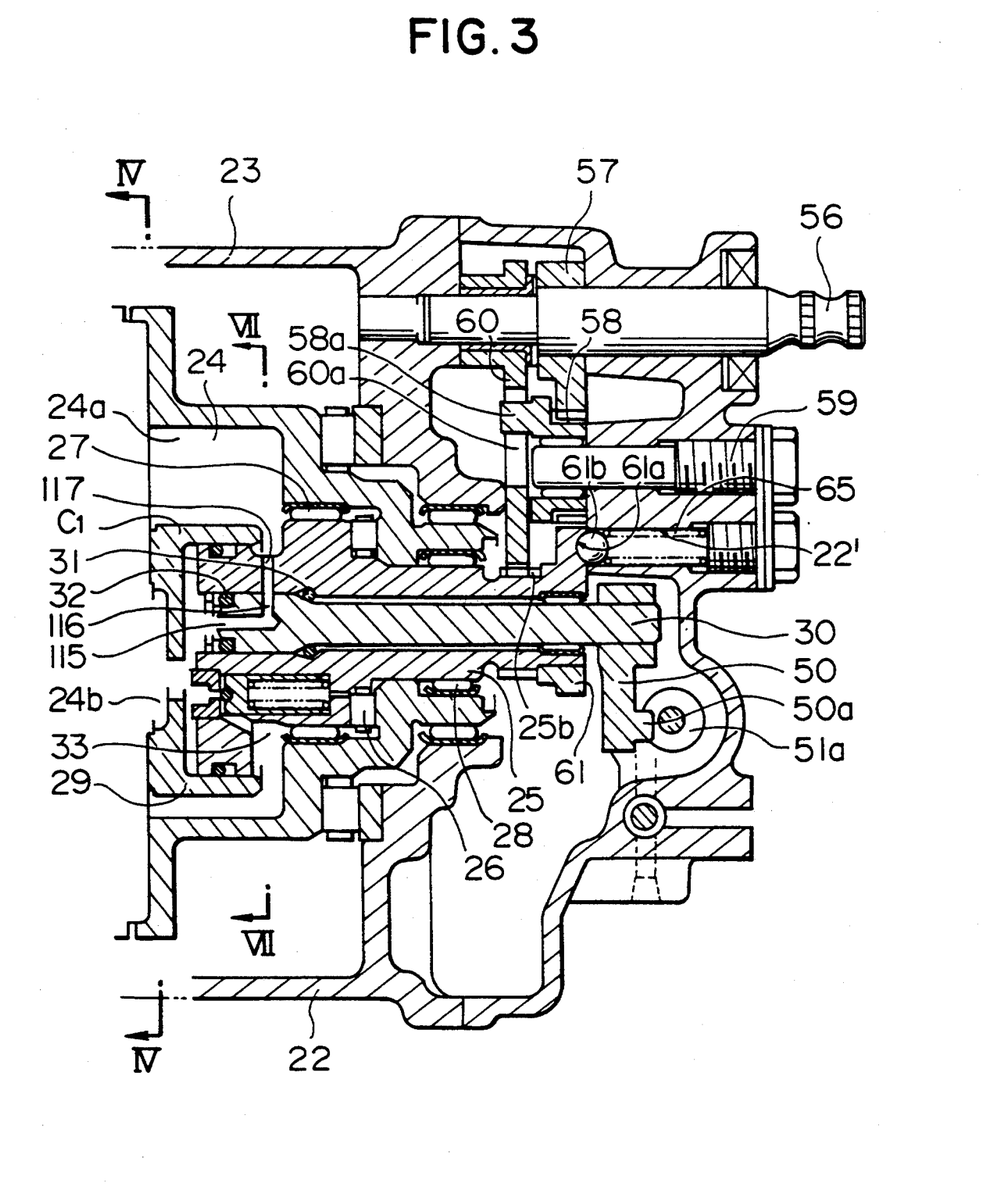
FIG. 3 is an enlarged view of a portion III shown in FIG. 1.
Figure 4:
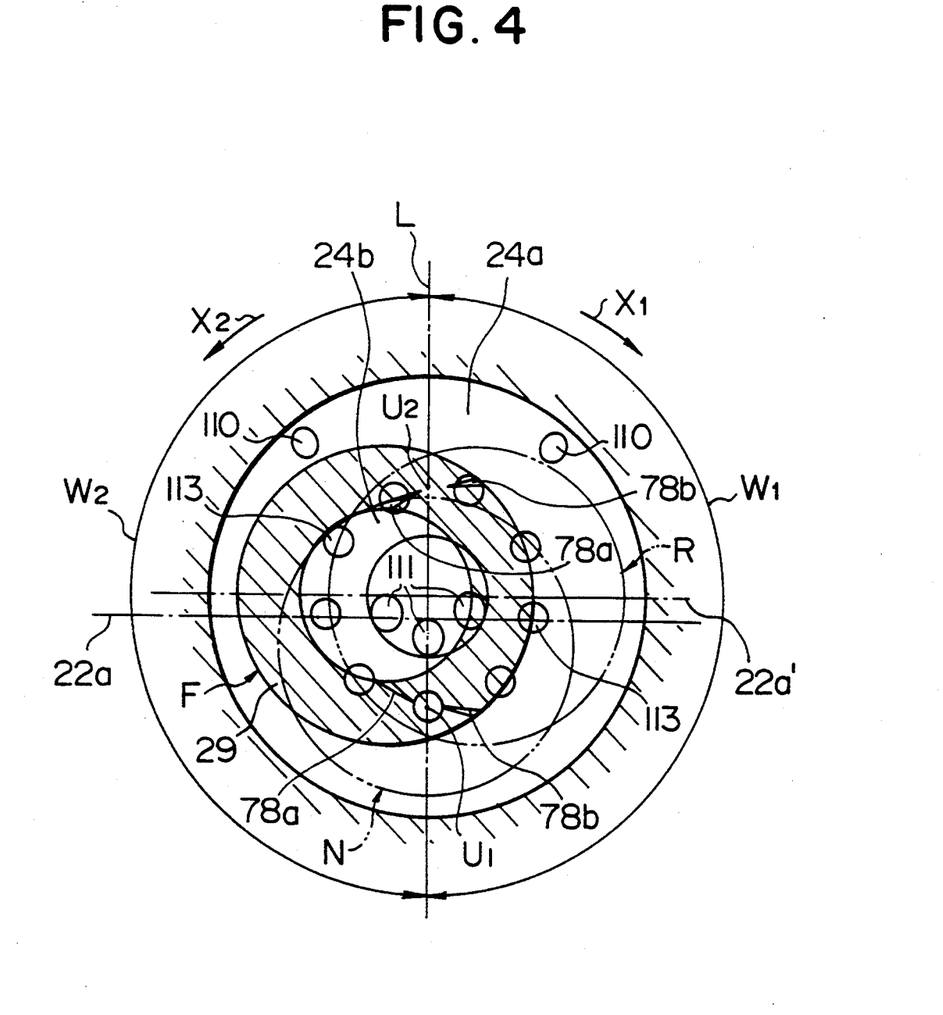
FIG. 4 is a sectional view taken on the line IV–IV of FIG. 3.

Referring to FIG. 4 showing an enlarged sectional view taken on the line IV—IV of FIG. 3, a line 22'a is the line parallel to the above-described trunnion shaft 22a and passing the axis of the input shaft. The top dead center (the most compressed point) U1 and the bottom dead center (the most expanded point) U2 of the plunger 18 are present on a line (hereinafter, referred to as "a driving direction border line") L which is perpendicular to the line 22'a. Provided that the forward driving rotation is indicated by the arrow X1, the neutral position N of the distributor ring 29 is defined to be a position where the center of the distributor ring 29 is on the driving direction border line L and closest to the top dead center U1. The forward driving position F is defined to be a position which is rotated about the axis of the supporting shaft 25 by substantially 90° from the neutral position N in the direction indicated by the arrow X1. The rear driving position R is defined to be a position which is rotated about the axis of the supporting shaft 25 by substantially 90° from the neutral position N in the direction indicated by the arrow X2.

Of the pump side fluid passages 110, 111, two pump-in passages 110 are provided so as to be connected to the outer cavity 24a. The rear openings of these passages are positioned at outer end portions on the upper side thereof so that they are connected to the outer cavity 24a no matter which of the positions: the forward driving position F, the neutral position N or the rear driving position R, the distributor ring 29 assumes.

Three pump-out passages 111 are provided so as to be connected to the inner cavity 24b. The rear end openings of these passages are positioned at the lower part in the vicinity of the axis so that they are connected to the inner cavity 24b no matter which of the positions: the forward driving position F, the neutral position N or the rear driving position R, the distributor ring 29 assumes.

On the other hand, the rear openings of the nine motor in-cut passages 113 are equidistantly arranged along the circumference of a circle having a center substantially coinciding with the rotational axis and a radius substantially half the radius of the cavity 24. A region W1 is defined to extend from the bottom dead center U2 to the top dead center U1 in the forward driving rotational direction X1 (substantially the right half region in the figure). A region W2 is defined to extend from the top dead center U1 to he bottom dead center U2 in the reverse driving rotational direction X2. When the distributor ring 29 is at the forward driving position F, the motor in-out passage 113 which are currently in the region W1 are connected to the outer cavity 24a, and he motor in-out passages 113 which are currently in he region W2 are connected to the inner cavity 24b. More specifically, during the forward driving rotation, the motor cylindrical holes 73 connected to the motor in-out passages 113 which are currently in the region W1 are in the discharge process, and the motor cylindrical holes 73 connected to the motor in-out passages 113 which are currently in the region W2 are in the expansion process. Thus, the hydraulic motor M is rotated in the forward driving rotational direction X1.

If he distributor ring 29 is at the neutral position N, the motor in-out passages 113 which are currently in a region substantially toward the bottom dead center U2 from the line 22'a are connected to the outer cavity 24a, and the motor in-out passages 113 which are currently within the range toward the top dead center U1 are connected to the inner cavity 24b. Thus the hydraulic motor M is not rotated.

If the distributor ring 29 is at the rear driving position R, the motor in-out passages 113 which are currently in the region W1 are connected to the inner cavity 24b, and the motor in-out passages 113 which are currently in the region W2 are connected to the outer cavity 24a. More specifically, during the rear driving rotation, the motor cylindrical holes 73 connected to the motor in-out passages 113 which are currently in the region W1 are in the expansion process, and the motor cylindrical holes 73 connected to the motor in-out passages 113 which are currently in the region W2 are in the discharge process. Thus, the hydraulic motor M is rotated in the rear or reverse driving rotational direction X2.

The front end surface (sliding surface) of the distributor ring 29 has a pair of wedge-shape grooves 78a and another pair of wedge-shape grooves 78b formed close to its inside and outside peripheries, respectively. The two pairs of wedge shape grooves 78a and 78b are positioned so that when the distributor ring 29 is at the forward and rear driving positions F and R, one of the grooves 78a and one of the grooves 78b come close to the top dead center U1, the grooves being in the different regions W1, W2, and so that the outer grooves 78a and 78b come close to the bottom dead center U2, the grooves being in the different regions W1, W2. When a motor in-out passage 113 passes either the top dead center U1 or the bottom dead center U2, the opening thereof is gradually closed by means of the adjacent groove as it moves from one of the cavities 24a or 24b to underneath the distributor ring 29, and then it is gradually opened by means of the adjacent groove as it moves from underneath the distributor ring 29 to the other cavity.

The construction of the main clutch C1 for switching on and off the flow of the fluid between the hydraulic pump P and the hydraulic motor M will be described with reference to FIG. 3. The main clutch spool 30 is fitted in the inside cylindrical hole of the supporting shaft 25 so as to be rotatable with respect to the supporting shaft 25. The main clutch spool 30 is supported by thrust load balls 31 and 32 so as to smoothly rotate even when receiving a load acting in the axial directions. A front end portion of the main clutch spool 30 has: a longitudinal passage 115 which has an opening to the inner cavity 24b and extends therefrom backward along the spool's axis; and passages 116 radially extending from the rear end portion of the longitudinal passage 115 to the outside surface of the main clutch spool 30. On the other hand, the supporting shaft 25 has passages 117 which have axes present on the same plane as the axes of the passage 116 and which extend outward to the outer cavity 24a. Therefore, by rotation of the main clutch spool 30, the above fluid passages 116, 117 are disconnected or connected to each other to switch on and off the main clutch C1.

Figure 7A:
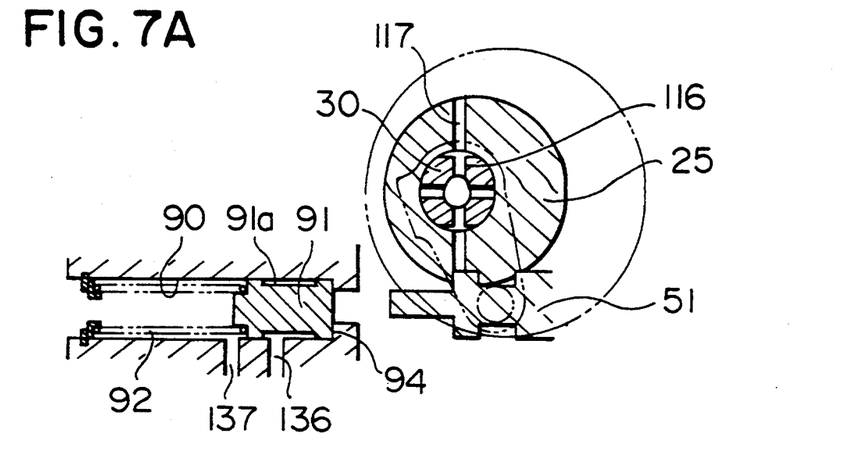
FIGS. 7A, 7B, 7C illustrate the operation of the clutch control means, corresponding to a sectional view taken on the line VII—VII of FIG. 3.
Figure 7B:
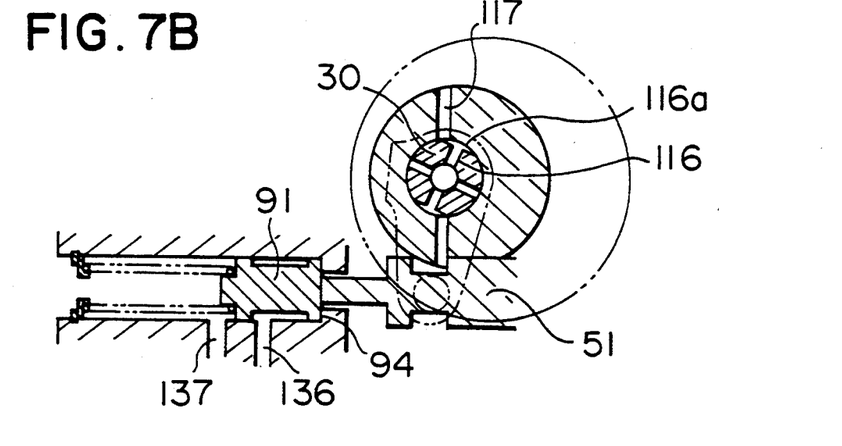
Figure 7C:
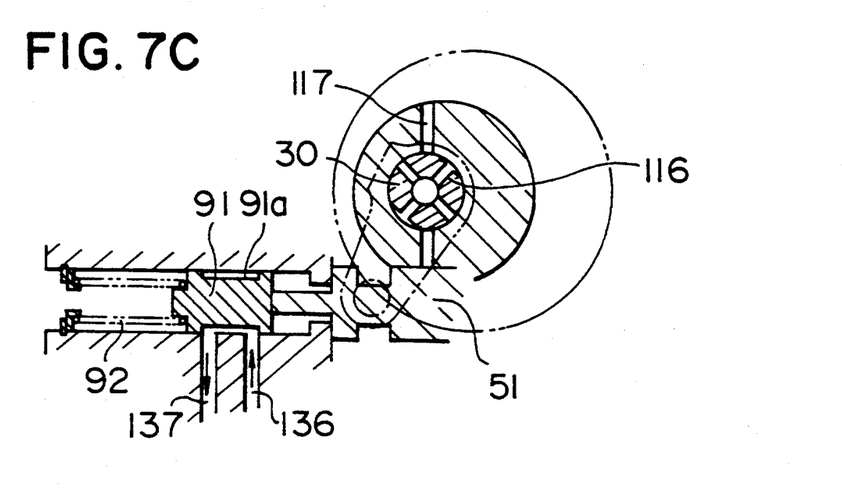

As shown in FIGS. 7A to 7C showing sectional views taken on the line VII—VII of FIG. 3, four passages 116 radially extending in the main clutch spool 30 are arranged in the shape of a cross, two of these passages extending vertically and the other two horizontally. Upper and lower end portions of the two vertically extending passages 116 are formed into grooves 116a extending in circumferential directions. The grooves 116a reduce the shocks caused by switching of the main clutch C1.

Two passages 117 are formed in the supporting shaft 25 so as to extend along a straight line which extends radially from the center axis of the main clutch spool 30 and perpendicularly to the direction of eccentricity of the eccentric cylindrical portion 25a of the supporting shaft 25. The openings of the two passages 117 on the inside peripheral surface of the supporting shaft 25 are arranged so as to have a substantially 180° phase difference from each other on the outer peripheral surface of the spool 30.

As shown in FIG. 3, the inside cylindrical portion of the supporting shaft 25 is provided with a high-pressure relief valve 33. The high-pressure relief valve 33 releases fluid from the inner cavity 24b to the outer cavity 24a when the fluid pressure in the inner cavity 24b becomes greater than a preset level. Optionally, the relief valve 33 may be constructed so as to release fluid from the outer cavity 24a to the inner cavity 24b as well as from the inner cavity 24b to the outer cavity 24a.

Shift means for shifting the fluid distributor ring supporting shaft 25 to the forward driving position F, the neutral position N and the rear driving position R will be described. Referring to FIG. 3, the supporting shaft 25 has a gear portion 25b formed at a rear end portion thereof. The gear portion 25b is engaged with a sector-shape shift gear 60 which is rotatably supported at its upper portion by a shift shaft 56. The shift gear 60 has a Long hole 60a extending vertically in a middle portion of the shift gear 60. The long hole 60a is engaged with an eccentric cylindrical projection 58a of an intermediate gear 58. The intermediate gear 58 is rotatably journaled to a supporting pin 59 fixed to the transmission case 22 and is engaged with a driving gear 57. The driving gear 57 is rigidly connected to the shift shaft 56 by means of a spring pin or the like. The shift shaft 56 is rotatably supported by a boss portion formed in the transmission case 22 and protrudes out from the transmission case 22. The protruding portion of the shift shaft 56 is drivingly connected to a suitable operating member such as an operating lever. Thus, by rotating the shift shaft using a suitable operating member, the intermediate gear 58 is rotated, the eccentric cylindrical projection 58a thus pivoting the shift gear 60 about the shift shaft 56, and then the shift gear 60 rotating the supporting shaft 25 by means of the gear 25b.

The intermediate gear 58 is engaged with a cam plate 61 which is rotatably journaled to a rear end portion of the supporting shaft 25. The cam plate 61 has detent grooves which define the forward and rear driving positions and the neutral position. A locking steel ball 61b is releasably engaged with a detent groove 61a. The locking steel ball 61b is fitted in a hole 22' formed in the transmission case 22 and pressed to the cam plate 61 by a compressed coil spring 65 provided in the hole 22'. Because of the restoring force of the compressed coil spring 65, the steel ball 61b is engaged with a detent groove 61a.

Figure 5:
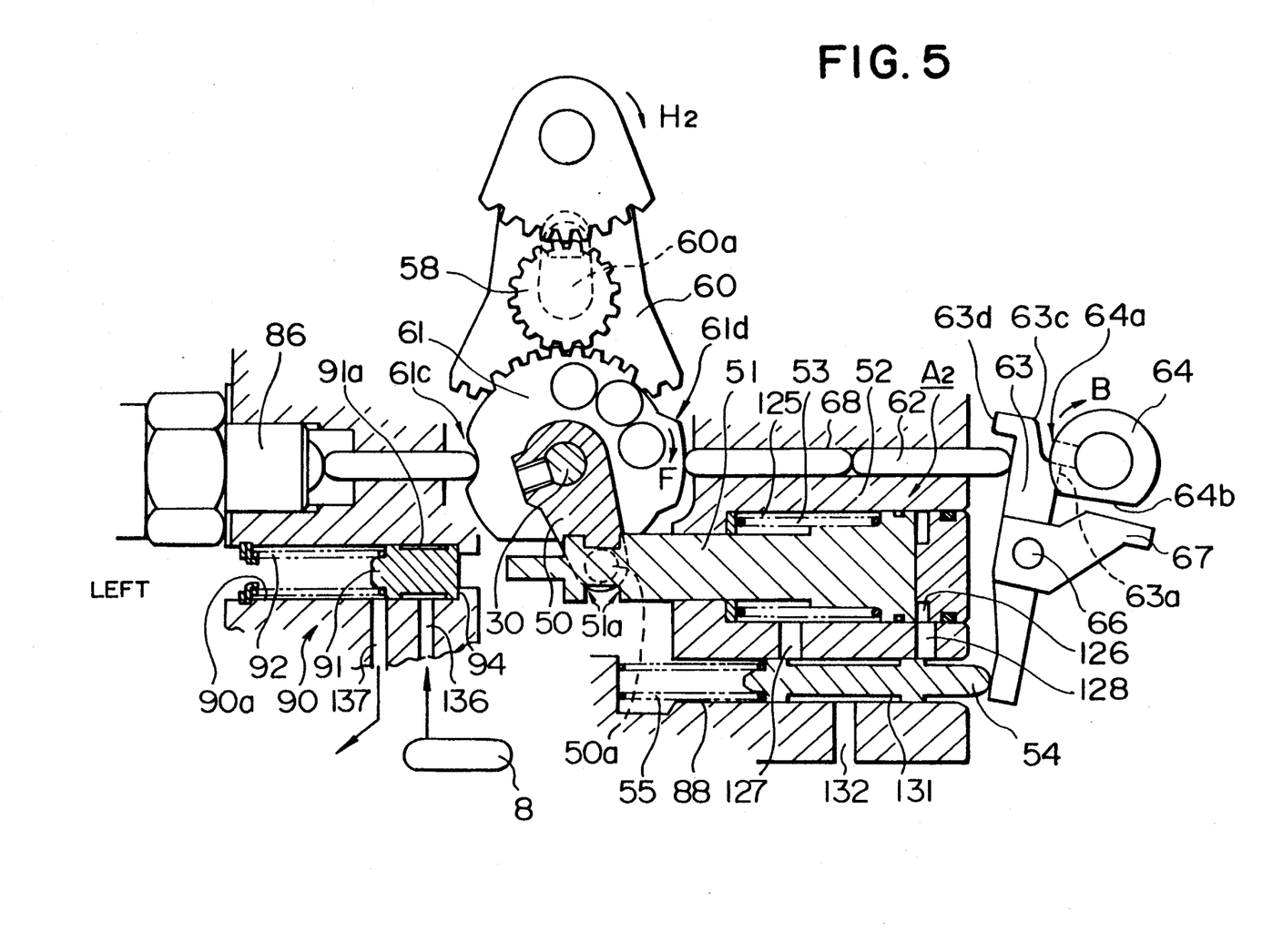
FIG. 5 is a longitudinal sectional view of the clutch control means in the neutral position.

As shown in FIG. 5, the cam plate 61 has: a projected cam portion 61d for preventing an operation error and opening a clutch valve so as to disconnect power transmission between the hydraulic pump P and the hydraulic motor M; and a recess cam portion 61c for operating a neutral switch 86.

Control means of the main clutch C1 will be described. Referring to FIG. 5, the spool 30 is rigidly connected at its rear end portion to a lever 50. The lever 50 has a cylindrical projection 50a formed on its end portion away from the spool 30. The projection 50a is engaged with a groove 51a which is formed on an end portion of a piston 51 of an actuator A2 for operating the clutch valve. A cylinder 52 is formed together with the transmission case 22. The piston 51 is fitted in the cylinder 52 so as to be movable perpendicularly to the axis of the spool 30 (to the right and left). The piston 51 divides the space inside the cylinder 52 into a left side chamber 125 and a right side chamber 126, and it is pushed by a compressed coil spring to the right (to the clutch-off side). The cylinder 52 has in its lower portion: a left side hole 127 formed so as to be connected to the left side chamber 125; and a right side hole 128 formed so as to be connected to the right side chamber 126. These holes 127 and 128 are connected to a control spool hole 88 which extends in parallel to the cylinder 52. A control spool 54 for selectively directing fluid into the cylinder 52 is fitted in the control spool hole 88. The control spool 54 has an annular passage 131 formed on its circumferential surface. A compressed coil spring 55 pushes the control spool 54 to the right. An inlet passage 132 is formed under a middle portion of the control spool hole 88 so as to be connected to the annular passage 131. The inlet passage 132 is connected to the so-called governor hydraulic source which varies the fluid pressure substantially in proportion to the square of the rotational speed of the engine, and the governor hydraulic pressure corresponding to the above pressure is supplied. If the annular passage 131 formed on the control spool 54 is connected to the right side hole 128, the fluid pressure in the right side chamber 126 of the cylinder 52 is increased in accordance with an increase of the rotational speed of the engine (substantially in proportion to the square of the rotational speed of the engine), thus moving the piston 51 to the left despite the restoring force of the coil spring 53. As a result, the spool 30 is rotated by means of the lever 50 so as to shift the main clutch 1 from the clutch-off position to the clutch-on position through the clutch meeting position.

Positioned to the left of the clutch valve operating piston 51 is a damper and governor hydraulic switch means 90 for achieving two-phase action of the piston 51 and for switching the governor hydraulic pressure of the above-described governor hydraulic actuator. The switch means 90 has a switching spool 91 having an annular fluid passage 91a, fitted movably in the axial direction within a cylindrical fitting hole 90a formed on the transmission case 22, and the spool 91 is pushed to the right (toward the piston 51) by a compressed coil spring 92 to be seated on a seat portion 94 on the right. Provided at the interior of the fitting hole 90a are: the opening of an inlet side governor hydraulic fluid passage 136 which is connected to the governor hydraulic source 8; and the opening of an outlet side governor hydraulic fluid passage 137 provided to the left of the inlet side governor hydraulic fluid passage. The outlet side governor hydraulic fluid passage 137 is connected to the inlet fluid passage 120 of the governor hydraulic actuator A1.

More specifically, the switch spool 91 is seated on the seat portion 94 as shown in FIGS. 7A and 7B at the time of clutch-off and at the time of half-clutch to disconnect the inlet side governor hydraulic fluid passage 136 from the outlet side governor hydraulic fluid passage 137. In the clutch-on state as shown in FIG. 7C, on the other hand, the inlet side governor hydraulic fluid passage 136 and the outlet side governor hydraulic fluid passage 137 are connected to each other through the annular fluid passage 91a.

The piston 51 is rapidly operated from the clutch-of state to the half-clutch, while it is operated slowly from the half-clutch state to the clutch-on state due to the restoring force of the compressed coil spring 92.

The operational relation between the clutch control mans and the shift operation means will be described with reference to FIG. 5. A pin hole 68 is formed above the cylinder 52 of the actuator A2 so as to extend to the right and left at substantially the same level as the spool 30. A pin 62 is fitted in the pin hole 68 so as to be slidable to the right and left. The pin 62 protrudes from the pin hole 68 to the right and left. The left end of the pin 62 is in contact with the above-mentioned cam plate 61. A cam shaft 64 is provided to the right of the right end of the pin 62 and is drivingly connected to the main braking apparatus of the vehicle. The cam shaft 64 has a projection 64a formed integrally on the left side thereof and a cut-away flat surface 64b formed integrally on the lower portion thereof.

To the right of the cylinder 52, an am 63 is rotatably supported by a shaft 66. The arm 63 extends substantially vertically and has a sub-arm 67 formed together with or rigidly connected to the arm 63. An upper end portion of the arm 63 is positioned between the pin 62 an the cam shaft 64. The upper end portion thereof has: a stopper portion 63d formed substantially in the shape of a letter L, the end portion of the stopper portion 63d protruding to the left; a stepped portion 63c formed on the right side of the upper portion; and a right-side shoulder portion 63a extending from the stepped portion 63c so as to face the cam shaft 64. A lower end portion of the arm 63 is in contact with the right end of the control spool 54. The sub-arm 67 extends from the arm 64 in an upper right direction, and has a flat surface formed on its upper end portion so as to face the flat surface 64b of the cam shaft 64.

Figure 6:
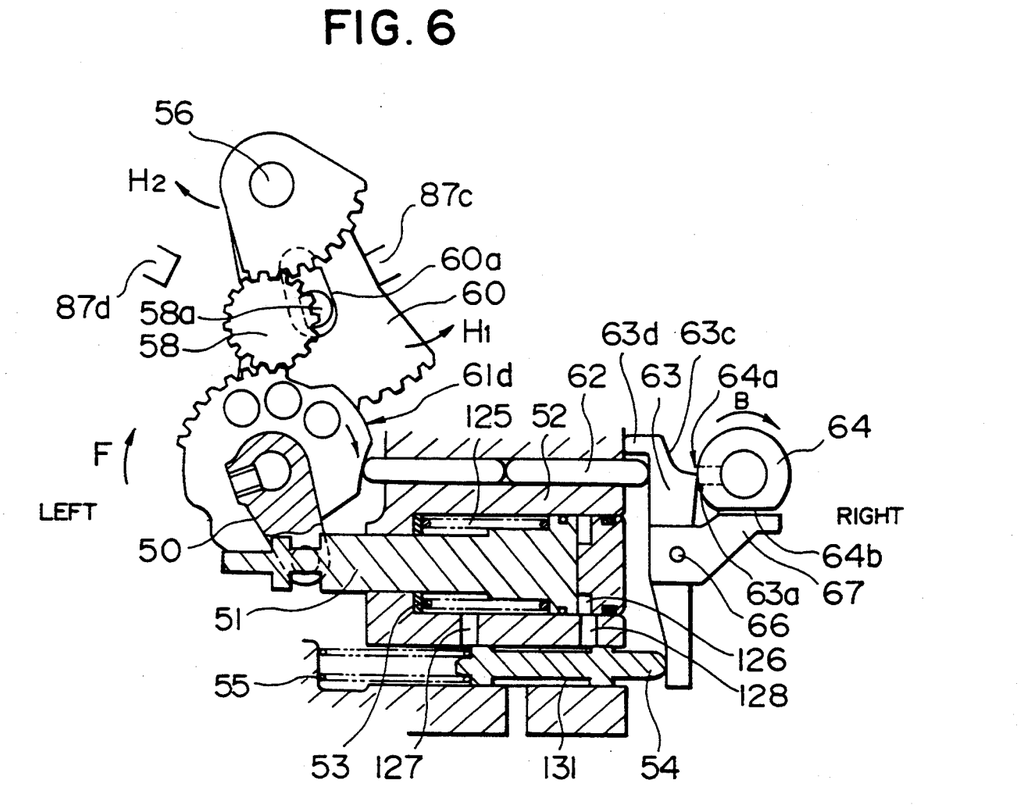
FIG. 6 is a longitudinal sectional view of the clutch control means in the forward operation position.

The am 63 restricts the movements of the spool 54, the cam shaft 64 and he pin 62. Referring o FIG. 6 showing the forward driving position, the projection 64a of the cam shaft 64 is positioned at the left side thereof in the brake-off state. Even if it is attempted to rotate the shift shaft 56 in the direction of arrow H2 from the forward driving position of FIG. 6 to the neutral position, the right shoulder portion 63a of the arm 63 interferes with the projection 64a whereby the pin 62 is not moved toward the arm 63 (to the right). Thus the stepped portion of the cam portion 61b of the cam plate is stopped by the pin 62, where the cam 61 is not rotated in the direction of the arrow F and does not return to the neutral position.

In the neutral position as shown in FIG. 5, the cam portion 61b of the cam plate 61 abuts on the pin 62 so that the pin 62 is shifted to the right, thus tilting the upper portion of the arm 63 to the right. As a result, the control spool 54 is pushed to the left by the lower portion of the arm 63, so as to connect the inlet passage 132 to the left side chamber 125 and to press the piston 51 to the right by means of the compressed spring 53 and the operating fluid pressure of the left-side chamber 125. In other words, even if the engine speed is increased while the neutral position is assumed, the piston 51 does not move to the left and the lever 50 is not rotated where the reduced-pressure state (the clutch-off state) is maintained.

In the brake-off state as shown in FIG. 6, the projection 64a of the cam shaft 64 abuts on the right shoulder portion 63a of the arm 63, as described above. If the brake is operated, the cam shaft 64 is rotated in the direction indicated by the arrow B, thus disengaging the projection 64a from the right shoulder 63a of the arm 63 as shown in FIG. 5. In short, when assuming the forward driving position, the brake must be operated to shift to the neutral position or to the rear driving position.

While the forward driving position is assumed as shown in FIG. 6, the lower flat surface 64b of the cam shaft 64 faces the upper flat surface of the sub-arm 67. If the brake is operated, the cam shaft 64 is rotated in the direction indicated by the arrow B. The cylindrical outer peripheral surface of the cam shaft 64 pushes down the sub-arm 67 so that the lower portion of the arm 63 swings to push the control spool 54 to the left. The inlet passage 132 is thus connected to the left side chamber 125. The piston 51 is hereby rapidly moved to the right due to a synthesized force of the fluid pressure in the left side chamber 125 and the coil spring 53, and the main clutch valve is rapidly shifted to is off-state.

The overall operation of the hydraulic transmission apparatus according to the present invention will be described.

When the pump cylinder block 2 is rotated by the rotation of the input shaft 1, the pump plungers 14 in the ejection process eject high-pressure fluid from the respective cylindrical holes 71 through the pump ejection passages 111 to the inner cavity 24b. The high-pressure fluid then flows into the cylindrical holes 73 which house the motor plungers 18 in the expansion process through the respective motor passages 113. On the other hand, the motor plungers 18 in the discharge process discharge the fluid from the respective cylindrical holes 73 through the respective motor passages 113 to the outer cavity 24a. The fluid discharged from the motor plungers 18 is drawn through the pump suction passages 110 to the pump cylindrical holes 71 whose pump plungers 14 are in the suction process. Thus, the motor cylinder block 4 is rotated by a combination of the reaction torque which the pump plungers 14 in the ejection process provide for the motor cylinder block 4 by means of the pump swash plate 15 and the reaction torque which the motor plungers 18 in the expansion process receive from the motor swash plate 19.

The tilt angle of the motor swash plate 19 is controlled, in accordance with the engine speed and the motor load, by a force acting toward its vertical side exerted by the governor hydraulic actuator A1 which causes the fluid pressure to rise substantially in proportion to the square of the rotational speed of the engine an by the tilt moment due to the pressing load of the motor plunger. Nonstep speed-change control is thereby achieved.

Clutching control will be described. As shown in FIG. 7A, the connection between the two gaps 24a, 24b (FIG. 3) at the time of clutch-off is short-circuited through the fluid passages 115, 116, 117. On the other hand, the switch spool 91 of the governor hydraulic switch means 90 is seated on the seat portion 94 to disconnect the two governor hydraulic fluid passages 136 and 137 from each other. The interior of the fluid chamber 82 of the governor hydraulic actuator A1 is open to the interior of the transmission case 22 through the inlet fluid passage 120 and the outlet side governor hydraulic fluid passage 137. Thus, the piston 35 of the governor hydraulic actuator A1 is pressed to the forward position by the coil spring 81. The motor swash plate 19 is thereby maintained at its maximum tilt state, i.e., at the maximum reduction ratio.

During the clutch meeting state as shown in FIG. 7B, while the two gaps 24a, 24b (FIG. 3) are partially disconnected from each other, the governor switch means 90 disconnects the governor hydraulic pressure to the governor hydraulic actuator A1 in a similar manner as the above-described clutch-off state. Thus, even if the motor load is small where the tilting moment of the motor swash place 19 is small, the motor swash plate 19 is maintained at the state of maximum tilt, i.e., of maximum speed reduction ratio, so that power transmission to the hydraulic motor M is smoothly initiated and the hydraulic motor M is started smoothly for operation.

Further, if operation to clutch-on is effected as shown in FIG. 7C, the governor hydraulic pressure is supplied to the governor hydraulic actuator A1 so that speed-change control is automatically performed as described by means of the engine speed and the motor load.

Figure 8:
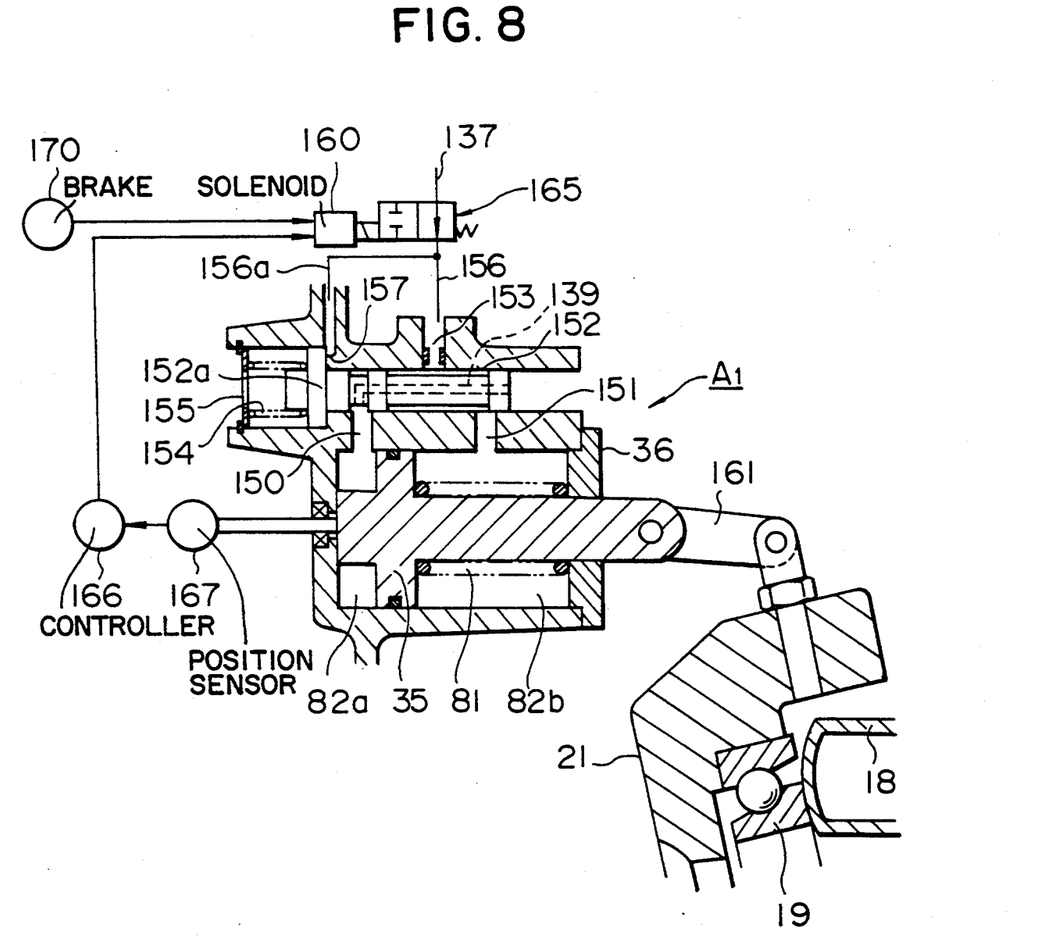
FIG. 8 is an enlarged longitudinal sectional view showing an example of modification of the governor hydraulic actuator.

FIG. 8 shows another example of the governor hydraulic actuator A1 and the clutch control means. A piston 35 in the hydraulic cylinder 36 is drivingly connected to the upper end portion of the swash plate holder 21 through a connecting link 161. The interior of the hydraulic cylinder 36 is divided by the piston 35 into a finest fluid chamber 82a at the front side and a right side fluid chamber 82b which have fluid openings 150 and 151, respectively. A four-port, two-position directional control valve 152 of the spool type movable in the axial direction is provided on the upper side of the hydraulic cylinder 36. An inlet fluid opening 153 positioned between the fluid openings 150 and 151 is formed on the upper side of the two position directional control valve 152 so that the inlet fluid hole 153 may be switched between the right side fluid chamber 82b and the left side fluid chamber 82a to be connected thereto by means of axial movement of the directional control valve 152.

The directional control valve 152 has a flange portion 152a integrally formed thereon and is pushed backward by a compressed coil spring 154 provided between the flange portion 152a and a spring receiving plate 155 in the front. The two position directional control valve 152 has a drain fluid passage 139 shown by dashed lines which is open to the interior of the transmission case 22 at one end thereof and is connected to the left side fluid chamber 82a in the state as shown in FIG. 8. The inlet fluid hole 153 is in communication with the outlet side governor hydraulic passage 137 of FIG. 5 through a fluid passage 156 and a two-port, two-position closing control valve 165. A pilot fluid passage 156a branches from the fluid passage 156, the pilot fluid passage 156 being in communication with a pilot fluid chamber 157 which is formed by the flange portion 152a of the directional control valve 152.

In other words, when governor hydraulic pressure is not supplied to the inlet fluid hole 153 or when the governor hydraulic pressure is low, the two position directional control valve 152 is maintained in the state pushed backward as shown in FIG. 8 by the compressed coil spring 154. The inlet fluid hole 153 is thereby connected to the right side fluid chamber 82b and the left side fluid chamber 82a is connected to the interior of the transmission case 22 through the drain fluid passage 139. On the other hand, if the governor hydraulic pressure to be supplied to the inlet fluid hole 153 exceeds a certain value, the directional control valve 152 is moved forward despite the force of the compresses coil spring 154 by the governor hydraulic pressure supplied to the pilot fluid chamber 157 from the pilot fluid passage 156a, so as to connect the inlet fluid hole 153 to the left side fluid chamber 82a.

The two-port, two-position closing control valve 165 is connected for example to an electromagnetic solenoid 160. The electromagnetic solenoid 160 is connected to a controller 166 and the controller 166 is connected to a potentiometer 167. The potentiometer 167 is connected to the hydraulic piston 35 to measure the position of the piston 35 and to input the result to the controller 166. The controller 166 is previously provided with predetermined speed-change ratio. When the speed-change ratio is detected, the controller 166 delivers a signal to the electromagnetic solenoid 160 to close the two-port, two-position closing control valve 165, so as to lock at the predetermined speed-change ratio by confining the operating fluid within the left side fluid chamber 82a.

Further, the electromagnetic solenoid 160 is connected also to a brake means 170 so that the electromagnetic solenoid 160 is turned off at the time of brake-on to release the lock.

As has been described, according to the present invention: a clutch means for achieving clutch-off state by short-circuiting a hydraulic closed circuit is provided; a governor hydraulic actuator is provided, by which a motor swash plate is moved toward its vertical position (in the direction along which the speed-reduction ratio becomes smaller) upon an increase in the operating fluid pressure corresponding to an increase in the rotational speed of the engine; a swash plate characteristic is provided, by which the motor swash plate is tilted toward the direction increasing the tilt angle thereof (in the direction along which the speed-reduction ratio becomes larger) upon an increase in the pressing force of the motor plunger; a governor hydraulic pressure switch means is provided in the governor hydraulic fluid passage for supplying governor hydraulic pressure to the governor hydraulic actuator; and the governor hydraulic pressure switch means is drivingly connected to the clutch means so that the governor hydraulic pressure is disconnected during the period from the clutch-off state to the elapse of the half-clutch state while the governor hydraulic pressure is supplied before and after the transition to the clutch-on state after substantially completing the half-clutch state. Thus, the following advantages may be achieved.

(1) During operation in the clutch-on state, a speed-change ratio corresponding to the rotational speed of the engine and the motor load is automatically determine, by such components as displacement of the tilting axis is of the motor swash plate and governor hydraulic pressure to the governor hydraulic actuator. That is, the speed-change ratio corresponding to the engine speed and the motor load may be automatically determine, and it is possible to achieve a hydraulic nonstep transmission apparatus with low costs and high reliability.

(2) Clutch operation to the clutch-on state through the clutch meeting state may be performed smoothly. That is, even when the clutch meeting state is assumed at the time of clutching control, the governor hydraulic pressure to the governor hydraulic actuator is disconnected. Thus, even when the motor load is small so that the tilting moment of the motor swash plate is small, the motor swash plate is brought to its maximum tilt state. Since clutch meeting is performed in the state where the maximum speed-reduction ratio is maintained, the hydraulic motor is smoothly started.

What is claimed is:

1. A hydraulic nonstep transmission apparatus connecting a swash plate hydraulic pump to a swash plate hydraulic motor through a hydraulic closed circuit and varying a capacity of the hydraulic motor by changing a tilt angle of a motor swash plate, the hydraulic nonstep transmission apparatus comprising:
   clutch means for achieving a clutch-off state by short-circuiting hydraulic closed circuit;
   a governor hydraulic actuator for moving the motor swash plate toward a vertical position in which the capacity of the motor is a minimum upon an increase in a governor hydraulic pressure corresponding to an increase in rotational speed of an engine; and
   a governor hydraulic pressure switch means provided is a governor hydraulic fluid passage for supplying the governor hydraulic pressure to the governor hydraulic actuator, the governor hydraulic pressure switch means being drivingly connected to the clutch means such that the governor hydraulic pressure is not supplied to the governor hydraulic actuator from the clutch-off state to the elapse of a clutch meeting state and the governor hydraulic pressure is supplied to the governor hydraulic actuator before and after transition to a clutch-on state after substantial completion of the clutch meeting state.

2. A hydraulic nonstep transmission apparatus for an engine connecting a swash plate hydraulic pump to a swash plate hydraulic motor through a hydraulic closed circuit and varying a capacity of the hydraulic motor by changing a tilt angle of a swash plate of the motor, the hydraulic nonstep transmission apparatus comprising:
   clutch means for achieving a clutch-off state by short-circuiting the hydraulic closed circuit;
   a governor hydraulic pressure source producing a governor hydraulic pressure substantially proportional to the square of the engine speed;
   a governor hydraulic actuator for moving the motor swash plate toward a vertical position in which the capacity of the motor is a minimum upon an increase in the governor hydraulic pressure;
   governor hydraulic pressure switch means for selectively making and breaking communication between a hydraulic passage communicating with the governor hydraulic pressure source and a hydraulic passage through which governor hydraulic pressure is supplied to the governor hydraulic actuator to activate the actuator; and
   means for interlocking the governor hydraulic pressure switch means and the clutch means such that the governor hydraulic pressure is not supplied to the governor hydraulic actuator from the clutch-off state to the elapse of a clutch meeting state and the governor hydraulic pressure is supplied to the governor hydraulic actuator before and after the transition to a clutch-on state after substantial completion of the clutch meeting state.

3. A hydraulic nonstep transmission apparatus for an engine comprising:
   a swash plate hydraulic pump;
   a swash plate hydraulic motor connected to the pump by a closed hydraulic circuit and having a swash plate with a variable tilt angle;
   a hydraulic clutch having a clutch-off state in which a fluid pathway is fully open to short-circuit the closed hydraulic circuit, a clutch meeting state in which the fluid pathway is partly closed, and a clutch-on state in which the fluid pathway is fully closed;
   a governor hydraulic pressure source producing governor hydraulic pressure substantially proportional to the square of the engine speed;
   a governor hydraulic actuator operatively connected to the swash plate of the motor and having a chamber for receiving fluid producing a force in a direction urging the swash plate to move towards a position in which capacity of the motor is a minimum; and
   a governor hydraulic pressure switch operatively connected to the clutch and the governor hydraulic actuator for preventing supply of the governor hydraulic pressure to the chamber of the governor hydraulic actuator during a transition of the clutch from the clutch-off state to the clutch meeting state and for enabling supply of the governor hydraulic pressure to the chamber after substantial completion of the clutch meeting state to the clutch-on state.

4. A transmission apparatus according to claim 3 wherein the governor hydraulic actuator includes a movable piston separating the chamber from inside a transmission case housing the governor hydraulic actuator.

5. A transmission apparatus according to claim 3 wherein the chamber of the governor hydraulic actuator comprises a first chamber and the governor hydraulic actuator includes a second chamber, a movable piston separating the first and second chambers and drivingly connected to the motor swash plate, and a valve operable to selectively connect one of the chambers to the governor hydraulic pressure source.

6. A transmission apparatus according to claim 5 wherein the valve is operatively connected to the governor hydraulic pressure source for operation by hydraulic pressure when the governor hydraulic pressure exceeds a prescribed level.

7. A transmission apparatus according to claim 5 wherein the valve fluidly connects the first chamber to inside of a transmission case when connecting the second chamber to the governor hydraulic pressure source.

8. A transmission apparatus according to claim 3 wherein the governor hydraulic pressure switch comprises:

a valve fluidly connected between the governor hydraulic pressure source and the governor hydraulic actuator and having a first position in which the valve isolates the governor hydraulic pressure source from the chamber of the governor hydraulic actuator and a second position in which the valve connects the governor hydraulic pressure source with the chamber; and a piston drivingly connected between the clutch and the valve for moving the valve between its first and second positions as the clutch moves between the clutch-meeting state and the clutch-on state.

9. A transmission apparatus according to claim 8 wherein the piston is moved by the clutch at a first speed as the clutch moves between the clutch-off state and the clutch-meeting state and at a second speed lower than the first speed as the clutch moves between the clutch-meeting state and the clutch-on state.

10. A transmission apparatus according to claim 9 wherein the valve comprises a sliding spool, and the piston has an end surface spaced from the spool when the clutch is in the clutch-off state and abutting the spool when the clutch is in the clutch-meeting state or the clutch-on state.

* * * * *

UNITED STATES PATENT AND TRADEMARK OFFICE
CERTIFICATE OF CORRECTION

PATENT NO. : 5,425,238
DATED : June 20, 1995
INVENTOR(S) : Izumi Takagi

It is certified that error appears in the above-indentified patent and that said Letters Patent is hereby corrected as shown below:

Column 15, Line 44, change "is" to --in--.

Signed and Sealed this

Twenty-ninth Day of August, 1995

Attest:

BRUCE LEHMAN

*Attesting Officer*     *Commissioner of Patents and Trademarks*